(12) United States Patent
Parent et al.

(10) Patent No.: US 8,198,379 B2
(45) Date of Patent: Jun. 12, 2012

(54) HALOBUTYL ELASTOMERS

(75) Inventors: John Scott Parent, Kingston (CA); Ralph Allen Whitney, Kingston (CA); Sergio A. Guillén-Castellanos, Calgary (CA); Rui Resendes, Kingston (CA)

(73) Assignee: LANXESS Inc., Sarnia, On (CA)

( * ) Notice: Subject to any disclaimer, the term of this patent is extended or adjusted under 35 U.S.C. 154(b) by 340 days.

(21) Appl. No.: 11/989,650

(22) PCT Filed: Aug. 2, 2006

(86) PCT No.: PCT/CA2006/001283
§ 371 (c)(1), (2), (4) Date: Apr. 7, 2009

(87) PCT Pub. No.: WO2007/016770
PCT Pub. Date: Feb. 15, 2007

(65) Prior Publication Data
US 2009/0203850 A1    Aug. 13, 2009

(51) Int. Cl.
*C08F 8/18* (2006.01)
*C08F 36/08* (2006.01)
*C08F 36/06* (2006.01)
*C08F 8/34* (2006.01)
*C07C 253/00* (2006.01)

(52) U.S. Cl. .............. 525/333.4; 525/333.1; 525/333.2; 525/333.5; 558/344

(58) Field of Classification Search .............. 525/256, 525/255, 258, 259, 319, 249, 279, 288, 333.1, 525/333.2, 333.4, 333.5; 558/344
See application file for complete search history.

(56) References Cited

U.S. PATENT DOCUMENTS

| 2,356,128 | A | | 8/1944 | Thomas et al. | 260/79 |
| 5,134,958 | A | * | 8/1992 | Zimmer | 118/119 |
| 5,548,029 | A | | 8/1996 | Powers et al. | 525/195 |

FOREIGN PATENT DOCUMENTS

| CA | 2279085 | | 1/2001 |
| CA | 2368363 | | 7/2003 |
| CA | 2383474 | | 10/2003 |
| CA | 2386098 | | 11/2003 |
| CA | 2418822 | | 8/2004 |
| CA | 2465301 | | 10/2005 |
| CA | 2471006 | | 12/2005 |
| GB | 1589985 | * | 8/1977 |
| GB | 1 589 985 | | 5/1981 |
| WO | WO2007-016770 | * | 2/2007 |

OTHER PUBLICATIONS

Ullmanns Encyclopedia of Industrial Chemistry, vol. A 23, 1993, pp. 288-295; Elvers et al; Rubber, 3, Synthetic.

Frechet, J.M.J.; J. Macromol,. Sci. Chem. 1981, A15(5), 877-890 "Chemical Modification of Halogenated Polymers Under Phase Transfer Conditions".

Frechet, J.M.J.et al; J. Org. Chem. vol. 44, No. 11, 1979 "Application of Phase-Transfer Catalysis to the Chemical Modification of Cross-Linked Polystyrene Resins" pp. 1774-1779.

Nishikubo, T.; Lizawa, T.; Kobayashi, K.; Masuda, Y.; Okawara, M. Macromolecules 1983, 16, pp. 722-727 Esterification Reaction of Poly[(chloromethyl)styrene] with Salts of Carboxylic Acids Using Phase-Transfer Catalysts.

\* cited by examiner

*Primary Examiner* — Ling Choi
*Assistant Examiner* — Monique Peets
(74) *Attorney, Agent, or Firm* — Michael A. Miller

(57) ABSTRACT

The present invention relates to the modification of butyl elastomers, particularly halobutyl elastomers, under solvent free conditions with a phase transfer catalyst in the presence of an alkyl metal salt of an oxygen or sulfur-based nucleophile.

8 Claims, No Drawings

HALOBUTYL ELASTOMERS

FIELD OF THE INVENTION

The present invention relates to the modification of butyl elastomers, particularly halobutyl elastomers, under solvent free conditions with a phase transfer catalyst in the presence of an alkyl metal salt of an oxygen or sulfur-based nucleophile.

BACKGROUND OF THE INVENTION

Butyl rubber (IIR), a random copolymer of isobutylene and isoprene is well known for its excellent thermal stability, ozone resistance and desirable dampening characteristics. IIR is prepared commercially in a slurry process using methyl chloride as a vehicle and a Friedel-Crafts catalyst as the polymerization initiator. The methyl chloride offers the advantage that $AlCl_3$, a relatively inexpensive Friedel-Crafts catalyst, is soluble in it, as are the isobutylene and isoprene comonomers. Additionally, the butyl rubber polymer is insoluble in the methyl chloride and precipitates out of solution as fine particles. The polymerization is generally carried out at temperatures of about –90° C. to –100° C. See U.S. Pat. No. 2,356,128 and *Ullmanns Encyclopedia of Industrial Chemistry*, volume A 23, 1993, pages 288-295. The low polymerization temperatures are required in order to achieve molecular weights which are sufficiently high for rubber applications.

Typically, commercial grades of IIR possess unsaturation levels of approximately 2 mol %. While this degree of unsaturation is commensurate with material stability, it also limits the cure reactivity of these polymers. The post-polymerization halogenation of the isoprene units found in IIR with either elemental Chlorine or Bromine results in the isolation of either Chlorobutyl (CIIR) or Bromobutyl (BIIR). These materials possess extremely reactive allylic halide sites which significantly enhance their rate of cure. Co-pending Canadian Patent Applications CA 2,386,098, CA 2,383,474, CA 2,368,363, CA 2,418,822, CA 2,465,301 and CA 2,471,006 disclose the ability to exploit the allylic bromide functionality present in BIIR in amine- and phosphine-based nucleophilic substitution reactions. The resulting substituted BIIR possesses enhanced levels of interaction with siliceous fillers and can be successfully incorporated in silica reinforced formulations.

While nucleophilic substitution occurs quite readily with neutral amines and phosphines, the analogous reactions with oxygen or sulfur based nucleophiles are much more arduous. The use of oxygen and sulfur based nucleophiles often requires the presence of a strong base, such as an alkali metal hydroxide, to yield the corresponding anionic nucleophile. Even though the depronated oxygen (or sulfur) nucleophile possesses the required level of nucleophilicity, its ionic nature limits its solubility in apolar polymer matrices such as BIIR. Consequently, solvents of intermediate polarity (e.g. THF, dichloromethane) are often used to facilitate such reactions.

From both an environmental and industrial perspective, it would be desirable to carry out such nucleophilic substitution reactions under solvent-free conditions. However, it is first necessary to overcome the solubility limits associated with the use of most deprotonated oxygen or sulfur nucleophiles. Phase transfer catalysis can offer a solution in overcoming the solubility limits.

Typically, phase transfer catalysis involves the introduction of catalytic amounts of a phase transfer catalyst (PTC), such as tetrabutylammonium bromide or trioctylmethylammonium chloride, (Aliquot® 336) into a solution containing an alkali metal salt of a nucleophile and the reactive substrate. Exchange of the alkali metal cation for either a tetrabutylammonium or trioctylmethylammonium counter-ion increases the solubility of the nucleophile in the dissolved rubber phase and ultimately increases the efficiency of the nucleophilic substitution reaction. See for example, Dehmlow, E. V.; Dehmlow, S. S. *Monographs in Modern Chemistry No 11: Phase Transfer Catalysis*, 2nd ed.; Verlag Chimie: Germany, 1983. Fréchet, J. M. J.; de Smet, M. D.; Farrall, M. J. *J. Org. Chem.* 1979, 44, 1774-1779; b) Fréchet, J. M. J. *J. Macromol. Sci.-Chem.* 1981, A15, 877-890. Nishikubo, T.; Iizawa, T.; Kobayashi, K.; Masuda, Y.; Okawara, M. *Macromolecules* 1983, 16, 722-727.

SUMMARY OF THE INVENTION

Surprisingly, it has now been discovered that phase transfer catalysis could be employed in the modification of butyl elastomers under solvent free conditions.

The present invention provides a solvent-free process for the modification of elastomers including mixing an elastomer with a phase transfer catalyst in the presence of an alkali metal salt of an oxygen or sulfur nucleophile.

The present invention also provides a solvent-free process for the modification of halobutyl elastomers including mixing a halobutyl elastomer with a phase transfer catalyst in the presence of an alkali metal salt of an oxygen or sulfur nucleophile.

DETAILED DESCRIPTION OF THE INVENTION

The phrase "halobutyl elastomer(s)" as used herein refers to a chlorinated and/or brominated butyl elastomer. Brominated butyl elastomers are preferred, and the present invention is illustrated, by way of example, with reference to such bromobutyl elastomers. It should be understood, however, that the present invention extends to the use of chlorinated butyl elastomers.

Thus, halobutyl elastomers suitable for use in the practice of the present invention include, but are not limited to, brominated butyl elastomers. Such elastomers may be obtained by bromination of butyl rubber (which is a copolymer having repeating units derived form at least one isoolefin, such as isobutylene and at least one co-monomer that is usually a $C_4$ to $C_6$ conjugated diolefin, preferably isoprene). Co-monomers other than conjugated diolefins can be used, however, and mention is made of alkyl-substituted vinyl aromatic co-monomers such as $C_1$- to $C_4$-alkyl substituted styrene. An example of such an elastomer which is commercially available is brominated isobutylene methylstyrene copolymer (BIMS) in which the co-monomer is p-methylstyrene.

Brominated butyl elastomer typically contain in the range of from 1 to 3 weight percent of repeating units derived from a diolefin, preferably isoprene and in the range of from 97 to 99 weight percent of repeating units derived from an isoolefin, preferably isobutylene, (based upon the hydrocarbon content of the polymer) and in the range of from 1 to 4 weight percent bromine (based upon the bromobutyl polymer). A typical bromobutyl polymer has a molecular weight, expressed as the Mooney viscosity (ML 1+8 at 125° C.), of in the range of from 28 to 55.

For use in the present invention the brominated butyl elastomer preferably contains in the range of from 1 to 5 weight percent of repeating units derived from a diolefin, such as isoprene and from 95 to 99 weight percent of repeating units derived from an isoolefin, such isobutylene (based upon the hydrocarbon content of the polymer) and from 0.5 to 2.5 weight percent, preferably from 0.75 to 2.3 weight percent, of bromine (based upon the brominated butyl polymer).

A stabilizer may be added to the brominated butyl elastomer. Suitable stabilizers include calcium stearate and epoxidized soybean oil, preferably used in an amount in the range of from 0.5 to 5 parts by weight per 100 parts by weight of the brominated butyl rubber.

Examples of suitable brominated butyl elastomers include LANXESS® Bromobutyl 2030™, LANXESS® Bromobutyl 2040™ (BB2040), and LANXESS® Bromobutyl X2™ commercially available from LANXESS Inc. LANXESS® BB2040 has a Mooney viscosity (RPML 1+8 @ 125° C. according to ASTM D 52-89) of 39±4, a bromine content of 2.0±0.3 wt. % and an approximate molecular weight Mw of 500,000 grams per mole.

The brominated butyl elastomer used in the process of this invention may also be a graft copolymer of a brominated butyl rubber and a polymer based upon a conjugated diolefin monomer. Co-pending Canadian Patent Application 2,279,085, published on Jan. 29, 2001 is directed towards a process for preparing such graft copolymers by mixing solid brominated butyl rubber with a solid polymer based on a conjugated diolefin monomer which also includes some C—S—(S)$_n$—C bonds, where n is an integer from 1 to 7, the mixing being carried out at a temperature greater than 50° C. and for a time sufficient to cause grafting. The bromobutyl elastomer of the graft copolymer can be any of those described above. The conjugated diolefins that can be incorporated in the graft copolymer generally have the structural formula:

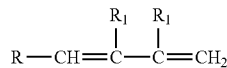

wherein R is a hydrogen atom or an alkyl group containing in the range of from 1 to 8 carbon atoms and wherein $R_1$ and $R_{11}$ can be the same or different and are selected from the group consisting of hydrogen atoms and alkyl groups containing in the range of from 1 to 4 carbon atoms. Some representative non-limiting examples of suitable conjugated diolefins include 1,3-butadiene, isoprene, 2-methyl-1,3-pentadiene, 4-butyl-1,3-pentadiene, 2,3-dimethyl-1,3-pentadiene 1,3-hexadiene, 1,3-octadiene, 2,3-dibutyl-1,3-pentadiene, 2-ethyl-1,3-pentadiene, 2-ethyl-1,3-butadiene and the like. Conjugated diolefin monomers containing in the range of from 4 to 8 carbon atoms are preferred, 1,3-butadiene and isoprene being preferred.

The polymer based on a conjugated diene monomer can be a homopolymer, or a copolymer of two or more conjugated diene monomers, or a copolymer with a vinyl aromatic monomer.

The vinyl aromatic monomers, which can optionally be used, are selected so as to be copolymerizable with the conjugated diolefin monomers being employed. Generally, any vinyl aromatic monomer, which is known to polymerize with organo-alkali metal initiators, can be used. Such vinyl aromatic monomers usually contain in the range of from 8 to 20 carbon atoms, preferably in the range of from 8 to 14 carbon atoms. Some examples of vinyl aromatic monomers which can be so copolymerized include styrene, alpha-methyl styrene, various alkyl styrenes including p-methylstyrene, p-methoxy styrene, 1-vinylnaphthalene, 2-vinyl naphthalene, 4-vinyl toluene and the like. Styrene is preferred for copolymerization with 1,3-butadiene alone or for terpolymerization with both 1,3-butadiene and isoprene. It is apparent to the skilled in the art that the given ranges for isoolefin and diolefin will have to be adjusted to result in a total of 100%.

The phase transfer catalyst suitable for use in the process of the present invention can be any phase transfer catalyst known to one skilled in the art. Non-limiting, examples of phase transfer catalysts are described in *Monographs in Modern Chemistry No* 11: *Phase Transfer Catalysis*, $2^{nd}$ ed.; Verlag Chimie: Germany, 1983. Preferred phase transfer catalysts include tetrabutylammonium hydroxide, tetrabutylammonium bromide, trioctylmethylammonium chloride (Aliquat® 336), and mixtures thereof.

The phase transfer catalyst can be employed in an amount of from 0.01 to 5.0 molar equivalents based on the molar content of allylic bromide in the halogenated butyl elastomer being modified, more preferably from 0.03 to 1.0 molar equivalents, yet more preferably from 0.05 to 0.08 molar equivalents.

Suitable alkyl metal salt of an oxygen or sulfur nucleophile for use in the present invention include metal salts of tert-butylacetic acid, stearic acid, benzoic acid, 4-(dimethylamino)benzoic acid, anthracene-9-carboxylic acid, linoleic acid and mixtures thereof which are prepared by neutralization with an appropriate hydroxide base. Suitable metals include potassium, lithium, sodium, magnesium, and calcium. Suitable carboxylic acids, include compounds of the formula R—CO$_2$H, where R is any suitable organic, inorganic or organometallic side group which is amenable to the derivatization methodology. Suitable thiols include compounds of the formula R—SH, where R is any suitable organic, inorganic or organometallic side group which is amenable to the derivatization methodology.

According to the present invention, the halobutyl elastomer, the phase transfer catalyst and metal salts of an oxygen or sulfur nucleophile are mixed together, suitably at a temperature in the range of from 50 to 250° C., preferably at a temperature in the range of from 75 to 200° C., more preferably at a temperature range of from about 100 to 150° C. Normally the mixing time does not exceed 120 minutes; a time in the range from 30 to 90 minutes is usually adequate. The mixing is suitably carried out in a Banbury mixer, or in a Haake or Brabender miniature internal mixer.

The order of addition of the components to the mixer is not critical. Preferably, the elastomer is added to the mixer and heated; the alkyl metal salt of an oxygen or sulfur nucleophile is then added, followed by the addition of the phase transfer catalyst.

The present invention is further illustrated in the following examples.

EXAMPLES

Materials

Brominated 2,2,4,8,8-pentamethyl-4-nonene (BPMN) was prepared as described previously (Parent, J. S.; Thom, D. J.; White, G.; Whitney, R. A.; Hopkins, W. *J. Polym. Sci., Part A: Polym. Chem.* 2001, 29, 2019-2026). The following reagents were used as received from Sigma-Aldrich (Oakville, Ontario): tetrabutylammonium hydroxide (1M in methanol), tetrabutylammonium bromide (98%) (TBAB), trioctylmethylammonium chloride (Aliquat® 336, 95%), tert-butylacetic acid (98%), stearic acid (98%), benzoic acid (98%), 4-(dimethylamino)benzoic acid (98%), anthracene-9-carboxylic acid (98%), linoleic acid (99%), and potassium hydroxide (99%). BIIR (Bayer BB2030) was used as supplied by LANXESS Inc. (Sarnia, Ontario). Tetrabutylammonium and potassium carboxylate salts were prepared from their corresponding carboxylic acids by neutralization with the appropriate hydroxide base.

Equipment

Solid phase PTC reactions were carried out with use of a Haake Polylab R600 internal mixer equipped with Banbury blades operating at 140° C. and 60 RPM. NMR spectra were recorded in CDCl$_3$ on a Bruker AM400 instrument with chemical shifts (δ) reported relative to tetramethylsilane in ppm. $^1$H NMR assignments were verified by 2D COSY analyses. Fourier-transform infrared spectra were acquired from solvent-cast films using a Niclolet Avatar ESP 360 instrument at a resolution of 4 cm$^{-1}$. Low-resolution mass spectrometry was carried out using a Fisons VG Quattro triple-quadrupole mass spectrometer using chemical ionization (i-C$_4$H$_{10}$) or a Waters/Micromass ZQ single-quadrupole mass spectrometer using electrospray ionization. A Waters/Micromass GC-T TOF mass spectrometer operating in electron impact mode was used to conduct high-resolution mass spectroscopy analysis.

Experimental Procedure for the Solvent-Free Modification Reactions (Solid Phase Reactions)

The polymer was preheated for approximately 1 minute prior to the addition of the prescribed amount of alkali metal carboxylate. After incorporation of the carboxylate salt (approximately 30-40 seconds), the desired amount of phase transfer agent was added. After mixing for the desired time, polymer samples were removed for analysis.

Experimental Procedure for Identification of Materials Obtained

The following comparative examples (Examples 1-6) were prepared for the purpose of aiding in the identification of materials obtained from the solid phase PTC modification of BIIR. Examples 1-6 are the small molecule, structural analogues of Examples 7-13. Since these species can be purified using standard purification methodologies, their isolation allows for the unambiguous assignment of $^1$H NMR resonances. These $^1$H NMR assignments are then used to substantiate the successful preparation of Examples 7-13.

In Examples 1-6, BPMN (a small molecule model compound of the reactive allylic sites found in BIIR) was used as the substrate.

Example 1

Synthesis and Isolation of (3,3-dimethylbutyl)-2-(2, 2-dimethylpropyl)prop-2-enyl 3,3-dimethylbutanoate (Example 1a) and (2E/Z)-6,6-dimethyl-2-(2,2-dimethylpropyl)hept-2-enyl 3,3-dimethylbutanoate (Example 1b-c)

BPMN (0.022 g, 0.081 mmole), tetrabutylammonium tert-butylacetate (0.043 g, 0.120 mmole) and dodecane (0.4 ml) were sealed in a 1 ml Wheaton vial and heated to 100° C. for one hour. The product was purified by column chromatography (silica, hexanes eluent) and isolated in vacuo to yield a yellow oil. It was possible to isolate the exomethylene isomer Example 1a by column chromatography using silica gel and a mixture of solvents (hexane:acetone:diethylether). FT-IR analysis: 1734 cm$^{-1}$ (C=O); MS analysis: required mass for C$_{20}$H$_{38}$O$_2$ is 310.5 m/e, found 311.4 m/e [M+H]$^+$ (Cl+) and 333.21 m/e [M+Na]$^+$ (ESI+); $^1$H NMR (CDCl$_3$) Example 1a: δ 5.18 (dd, 1H, —CHOC(O)—), 5.09 (s, 1.04H, =CH$_2$), 4.86 (s, 1.06, =CH$_2$), 2.20 (dd, 2.1H, —CH$_2$—), 1.92 (dd, 2.2H, —CH$_2$—), 1.56 (m, 2.5H, —CH$_2$—), 0.6-1.3 (m, 33.2H, 2×—C(CH$_3$)$_3$, 1×—CH$_2$—). Example 1b-c: $^1$H NMR (CDCl$_3$): δ 4.48 (s, 1H, —CH$_2$OC(O)—), 5.55 (t, 0.5H, =C—H), 4.55 (s, 0.19H, —CH$_2$OC(O)—), 5.39 (t, 0.08H, =C—H), 0.6-2.3 (m, 59.4H, 2×—C(CH$_3$)$_3$, 4×—CH$_2$—). NOESY $^1$H NMR: Example 1b: E-isomer; Example 1c: Z-isomer.

Example 2

Synthesis and Isolation of (3,3-dimethylbutyl)-2-(2, 2-dimethylpropyl)prop-2-enyl stearate (Example 2a) and (2E/Z)-6,6-dimethyl-2-(2,2-dimethylpropyl)hept-2-enyl stearate (Example 2b-c)

BPMN (0.044 g, 0.163 mmole), tetrabutylammonium stearate (0.085 g, 0.162 mmole) and dodecane (0.4 ml) were sealed in a 1 ml Wheaton vial and heated to 100° C. for one hour. The product was purified by column chromatography (silica, hexanes eluent) and isolated in vacuo to yield a yellow oil. FT-IR analysis: 1734 cm$^{-1}$ (C=O). MS analysis: required mass for C$_{32}$H$_{62}$O$_2$ is 478.83 m/e, found 478.5 m/e (El+) and 479.5 m/e [M+H]$^+$ (Cl+). $^1$H NMR (CDCl$_3$) Example 2: δ 0.6-2.4 (m, 108.2H, 3×—C(CH$_3$)$_3$, 19×—CH$_2$—), 4.4-5.6 (m, 3.3H, 1×—CHOC(O)—, 2×=CH$_2$, 2×—CH$_2$OC(O)—, 2 ×=C—H); Example 2a: δ 5.17 (dd, —CHOC(O)—), 5.07 (s, =CH$_2$), 4.84 (s, =CH$_2$); Example 2b: δ 4.49 (s, —CH$_2$OC(O)—), 5.52 (t, =C—H); Example 2c: δ 4.56 (s, —CH$_2$OC(O)—), 5.39 (t, =C—H).

Example 3

Synthesis and Isolation of (3,3-dimethylbutyl)-2-(2, 2-dimethylpropyl)prop-2-enyl linoleate (Example 3a) and (2E/Z)-6,6-dimethyl-2-(2,2-dimethylpropyl)hept-2-enyl linoleate (Example 3b-c)

BPMN (0.044 g, 0.163 mmole), linoleic acid (0.08 ml, 0.257 mmole), KOH (0.02 g, 0.35 mmol), Aliquat® 336 (0.05 ml, 0.1 mmol) and toluene (1 ml) were transferred to a round bottom flask and heated to 70° C. for three hour. The product was purified by column chromatography (silica, hexanes eluent) and isolated in vacuo to yield a yellow oil. FT-IR analysis: 1734 cm$^{-1}$ (C=O). MS analysis: required mass for C$_{32}$H$_{58}$O$_2$ is 474.4437 m/e, found 474.4427 m/e (TOF MS El+). $^1$H NMR (CDCl$_3$) Example 3: δ 0.6-2.8 (m, 123.3H, 3×—C(CH$_3$)$_3$, 15×—CH$_2$—), 4.4-5.6 (m, 7.98H, 1×—CHOC(O)—, 2×=CH$_2$, 2×—CH$_2$OC(O)—, 6×=C—H); Example 3a: δ 5.17 (dd, —CHOC (O)—), 5.08 (s, =CH$_2$), 4.84 (s, =CH$_2$); Example 3b: δ 4.48 (s, —CH$_2$OC(O)—), 5.52 (t, H—C=); Example 3c: δ 4.51 (s, —CH$_2$OC(O)—), 5.40 (t, H—C=).

Example 4

Synthesis and Isolation of 1-(3,3-dimethylbutyl)-2-(2,2-dimethylpropyl)prop-2-enyl benzoate (Example 4a) and (2E/Z)-6,6-dimethyl-2-(2,2-dimethylpropyl)hept-2-enyl benzoate (Example 4b-c)

BPMN (0.022 g, 0.081 mmole) tetrabutylammonium benzoate (0.040 g, 0.110 mmole) and toluene (0.4 ml) were sealed a 1 ml Wheaton vial and heated to 95° C. with agitation for 90 minutes. The dark yellow product was diluted with hexanes then charged to a silica column. Non-polar components were eluted with hexanes, while Example 4 was isolated by a subsequent elution with dichloromethane and drying in vacuo. High resolution MS analysis: required for C$_{21}$H$_{32}$O$_2$ m/e 316.2402, found m/e 316.2394. FT-IR analysis: 1723 cm$^{-1}$ (C=O); 1265 cm$^{-1}$ (C—O—C). $^1$H NMR (CDCl$_3$): Example 4: δ 0.6-2.2 (m, 105H, 2×—C(CH$_3$)$_3$, 3×—CH$_2$—), 4.6-5.7 (m, 9.8H, 1×—CHOC(O)—, 2×=CH$_2$, 2×—CH$_2$OC(O)—, 2×=C—H), 7.4-8.2 (m, 15.6H, 5×=CH—); Example 4a: δ 5.43 (dd, —CHOC(O)—), 5.18 (s, =CH$_2$), 4.89 (s, =CH$_2$). Example 4b: δ 4.75 (s, —CH$_2$OC(O)—), 5.64 (t, =C—H). Example 4c: δ 4.82 (s, —CH$_2$OC(O)—), 5.46 (t, =C—H).

Example 5

Synthesis and Isolation of 1-(3,3-dimethylbutyl)-2-(2,2-dimethylpropyl)prop-2-enyl 4-(dimethylamino)benzoate (Example 5a) and (2E/Z)-6,6-dimethyl-2-(2,2-dimethylpropyl)hept-2-enyl p-(dimethylamino)benzoate (Example 5b-c)

BPMN (0.011 g, 0.040 mmole), tetrabutylammonium 4-(dimethylamino)benzoate (0.020 g, 0.120 mmole) and dodecane (0.4 ml) were sealed in a 1 ml Wheaton vial and heated to 100° C. for one hour. The dark yellow/brown mixture was diluted with hexanes then charged to a silica column. Non-polar components were eluted with hexanes, while Example 5 was isolated by a subsequent elution with dichloromethane and drying in vacuo. High resolution MS analysis: required for C$_{24}$H$_{39}$NO$_2$ m/e 359.2824; found m/e 359.2837. FT-IR analysis: 1704 cm$^{-1}$ (C=O); 1365, 1278, 1183 and 1106 cm$^{-1}$ (C—O—C stretching vibrations of a para-substituted benzene ring). $^1$H NMR (CDCl$_3$) Example 5: δ 0.6-2.2 (m, 130H, 2×—C(CH$_3$)$_3$, 3×—CH$_2$—), 3.01 (s, 20.4H, 2×NCH$_3$), 4.6-5.7 (m, 8.98H, 1×—CHOC(O)—, 2×=CH$_2$, 2×—CH$_2$OC(O)—, 2×=C—H), 6.5-8.0 (m, 13.5H, 4×=CH—); Example 5a: δ 5.38 (dd, —CHOC(O)—), 5.17 (s, =CH$_2$), 4.85 (s, =CH$_2$). Found for Example 5b: δ 4.76 (s, —CH$_2$OC(O)—), 5.42 (t, =C—H). Found for Example 5c: δ 4.68 (s, —CH$_2$OC(O)—), 5.70 (t, =C—H).

Example 6

Synthesis and Isolation of (3,3-dimethylbutyl)-2-(2,2-dimethylpropyl)prop-2-enyl 9-anthracenate (Example 6a) and (2E/Z)-6,6-dimethyl-2-(2,2-dimethylpropyl)hept-2-enyl 9-anthracenate (Example 6b-c)

BPMN (0.044 g, 0.163 mmole), tetrabutylammonium anthracene-9-carboxylate (0.1 g, 0.2 mmole) and toluene (0.4 ml) were transferred to a round bottom flask and heated to 80° C. for one hour. The product was purified by column chromatography (alumina, hexanes eluent) and isolated in vacuo to yield a yellow oil. FT-IR analysis: 1721 cm$^{-1}$ (C=O). MS analysis: required mass for C$_{29}$H$_{36}$O$_2$ is 416.2725 m/e, found 416.2715 m/e (TOF MS El+). $^1$H NMR (CDCl$_3$) Example 6: δ 0.7-2.3 (m, 46.2H, 2×—C(CH$_3$)$_3$, 3×—CH$_2$—), 4.9-5.9 (m, 4.78H, 1×—CHOC(O)—, 2×=CH$_2$, 2×—CH$_2$OC(O)—, 2×=C—H), 7.4-8.6 (m, 14.06H, 9×=CH—); Example 6a: δ 5.81 (dd, —CHOCO—), 5.27 (s, =CH$_2$), 5.01 (s, =CH$_2$). Example 6b: δ 5.13 (s, —CH$_2$OCO—), 5.52 (t, =C—H). Example 6c: δ 5.06 (s, —CH$_2$OCO—), 5.81 (t, =C—H).

The following examples illustrate the present invention. In Examples 7-13, PTC reactions were carried out in the solid state using BIIR as the reactive substrate.

Example 7

Synthesis of t-butyl Acetate Ester of BIIR using TBAB 40 gms of BIIR was loaded into the internal mixer at 140° C. Following an initial breakdown period of 1 minute, 1.1 equivalent (based on total allylic bromide content as determined by $^1$H NMR in CDCl$_3$) of potassium t-butylacetate was added into the mixer. After allowing for the incorporation of the acetate salt (approximately 30-40 seconds), 0.08 equivalents of TBAB was introduced into the mixer. The PTC reaction was allowed to proceed for a total of 50 minutes.

Example 8

Synthesis of t-butyl Acetate Ester of BIIR Using Aliquat 336®

40 gms of BIIR was loaded into the internal mixer at 140° C. Following an initial breakdown period of 1 minute, 1.1 equivalent (based on total allylic bromide content as determined by $^1$H NMR in CDCl$_3$) of potassium t-butylacetate was added into the mixer. After allowing for the incorporation of the acetate salt (approximately 30-40 seconds), 0.08 equivalents of Aliquat 336® (trioctylmethylammonium chloride) was introduced into the mixer. The PTC reaction was allowed to proceed for a total of 50 minutes.

Example 9

Synthesis of Stearate Ester of BIIR 40 gms of BIIR was loaded into the internal mixer at 140° C. Following an initial breakdown period of 1 minute, 1.1 equivalent (based on total allylic bromide content as determined by $^1$H NMR in CDCl$_3$) of potassium stearate was added into the mixer. After allowing for the incorporation of the acetate salt (approximately 30-40 seconds), 0.08 equivalents of TBAB was introduced into the mixer. The PTC reaction was allowed to proceed for a total of 60 minutes.

Example 10

Synthesis of Linoleate Ester of BIIR 40 gms of BIIR was loaded into the internal mixer at 140° C. Following an initial breakdown period of 1 minute, 1.1 equivalent (based on total allylic bromide content as determined by $^1$H NMR in CDCl$_3$) of sodium linoleate was added into the mixer. After allowing for the incorporation of the acetate salt (approximately 30-40 seconds), 0.16 equivalents of TBAB was introduced into the mixer. The PTC reaction was allowed to proceed for a total of 50 minutes.

Example 11

Synthesis of Benzoate Ester of BIIR 40 gms of BIIR was loaded into the internal mixer at 140° C. Following an initial breakdown period of 1 minute, 1.1 equivalent (based on total allylic bromide content as determined by $^1$H NMR in CDCl$_3$) of potassium benzoate was added into the mixer. After allowing for the incorporation of the acetate salt (approximately 30-40 seconds), 0.08 equivalents of TBAB was introduced into the mixer. The PTC reaction was allowed to proceed for a total of 50 minutes.

Example 12

Synthesis of 4-(dimethylamino)benzoate Ester of BIIR 40 gms of BIIR was loaded into the internal mixer at 140° C. Following an initial breakdown period of 1 minute, 1.1 equivalent (based on total allylic bromide content as determined by $^1$H NMR in $CDCl_3$) of potassium 4-(dimethylamino)benzoate was added into the mixer. After allowing for the incorporation of the acetate salt (approximately 30-40 seconds), 0.08 equivalents of TBAB was introduced into the mixer. The PTC reaction was allowed to proceed for a total of 45 minutes.

Example 13

Synthesis of 9-anthracenate Ester of BIIR 40 gms of BIIR was loaded into the internal mixer at 140° C. Following an initial breakdown period of 1 minute, 1.1 equivalent (based on total allylic bromide content as determined by $^1$H NMR in $CDCl_3$) of potassium 9-anthracenate was added into the mixer. After allowing for the incorporation of the acetate salt (approximately 30-40 seconds), 0.08 equivalents of TBAB was introduced into the mixer. The PTC reaction was allowed to proceed for a total of 50 minutes.

The small molecule esters (Examples 1-7) were prepared by a solution PTC method. These materials were unambiguously identified with the use of FT-IR, MS and $^1$H NMR. The preparation of the t-butylacetate ester of BIIR (Example 7) via solid phase PTC modification (using TBAB as the PTC catalyst) was confirmed by comparison of the $^1$H NMR spectrum acquired for this material and that obtained from its small molecule analogue, Example 1. Similarly, the presence of the t-butylacetate ester of BIIR (Example 8) was confirmed by $^1$H NMR comparison with Example 1. In this instance, Aliquat 3360 (trioctylmethylammonium chloride) was employed as the PTC agent. The use of potassium stearate in conjunction with TBAB allowed for the preparation of the stearate ester of BIIR (Example 9), the identity of which was confirmed by comparison of $^1$H NMR as measured from Example 2. Using a similar approach, the preparation of the linoleate ester (Example 10, c.f. Example 3), benzoate ester (Example 11, c.f. Example 4), 4-(dimethylamino)benzoate ester (Example 12, c.f. Example 5) and 9-anthracenate ester (Example 13, c.f. Example 6) of BIIR has been demonstrated.

The solvent-free (solid phase) modification of BIIR using a novel PTC approach is of general applicability. Using this same approach, it would be apparent to those skilled in the art that this novel methodology can be extended to a variety of polymeric substrates (i.e. those polymeric substrates possessing a functional group containing a group consisting of an electrophilic leaving group which is bound to an atom belonging to group 13 and/or 14 and/or 15), a suitable metal salt of an oxygen or sulfur based nucleophile and a suitable phase transfer catalyst.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for modifying a butyl elastomer comprising, mixing a butyl elastomer with a phase transfer catalyst in the presence of an alkyl metal salt of an oxygen or sulfur nucleophile, wherein the process does not include the presence of a solvent.

2. The process according to claim 1, wherein the elastomer is a copolymer of at least one isoolefin and at least one $C_4$ to $C_6$ conjugated diolefin.

3. The process according to claim 2, wherein the elastomer is a copolymer of isobutylene and isoprene.

4. The process according to claim 1, wherein the elastomer is chlorinated or brominated.

5. The process according to claim 1, wherein the phase transfer catalyst comprises tetrabutylammonium bromide or trioctylmethylammonium chloride.

6. The process according to claim 1, wherein the alkyl metal salt of an oxygen or sulfur nucleophile comprises a metal salt of tert-butylacetic acid, stearic acid, benzoic acid, 4-(dimethylamino) benzoic acid, anthracene-9-carboxylic acid, linoleic acid or a mixture thereof.

7. The process according to claim 1, wherein the elastomer and the phase transfer catalyst are mixed at a temperature in the range of from 50 to 250° C.

8. The process according to claim 1, wherein elastomer is brominated and wherein the phase transfer catalyst is mixed in an amount from 0.01 to 5.0 molar equivalents based on a molar content of allylic bromide in the brominated butyl elastomer.

* * * * *